No. 714,885. Patented Dec. 2, 1902.
J. E. FAUGHT.
FURNITURE JOINT FASTENING.
(Application filed Feb. 8, 1902.)
(No Model.)
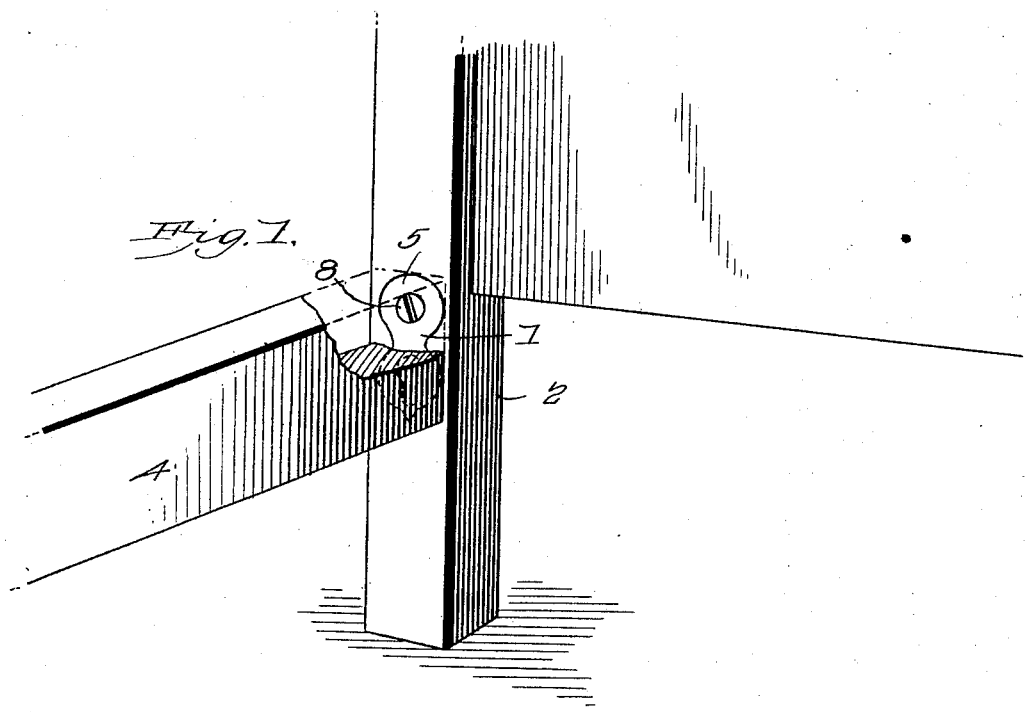
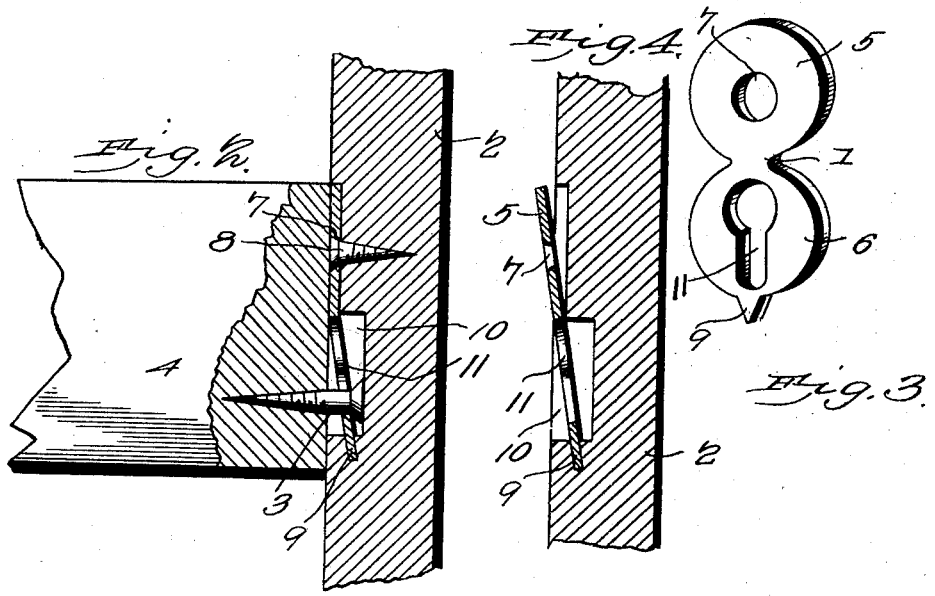
Witnesses
John E. Faught, Inventor
Attorneys

UNITED STATES PATENT OFFICE.

JOHN E. FAUGHT, OF COLUMBIA CITY, INDIANA, ASSIGNOR OF ONE-HALF TO AMELIUS D. VERGON, OF COLUMBIA CITY, INDIANA.

FURNITURE-JOINT FASTENING.

SPECIFICATION forming part of Letters Patent No. 714,885, dated December 2, 1902.

Application filed February 8, 1902. Serial No. 93,166. (No model.)

*To all whom it may concern:*

Be it known that I, JOHN E. FAUGHT, a citizen of the United States, residing at Columbia City, in the county of Whitley and State of Indiana, have invented a new and useful Furniture-Joint Fastening, of which the following is a specification.

The invention relates to a joint-fastener particularly designed for furniture and adapted for securing in their operative relations the meeting members of an article of furniture—such as the side rails and posts of a bedstead or the frame-bars and uprights of a chair, sofa, or the equivalent thereof; and the object of the invention is to provide a simple, inexpensive, and efficient fastener adapted to be applied with facility and having a combined wedging and spring action, whereby the members of the article of furniture are held in close frictional contact to prevent yielding vibration and consequent creaking.

Further objects and advantages of the invention will appear in the following description, and the novel features thereof will be particularly pointed out in the appended claims, it being understood that changes in the form, proportion, and the minor details of construction may be resorted to without departing from the spirit or sacrificing any of the advantages of this invention.

In the drawings, Figure 1 is a view of a fastener constructed in accordance with the invention applied in the operative position with the connected members of an article of furniture. Fig. 2 is a section of the same. Fig. 3 is a detail view of the fastener detached. Fig. 4 is a detail sectional view showing the first step in the operation of applying the fastener to the upright of an article of furniture.

Similar reference characters indicate corresponding parts in all the figures of the drawings.

In the illustrated embodiment of the invention the fastener consists of a spring-metal plate 1, which is elongated and is provided with terminal means of attachment to an article of furniture, such as the upright 2, and a headed pin or bolt 3, projecting from the extremity of the furniture member 4, which is to be connected with the upright. In the construction illustrated the plate consists of connected disk-like elements 5 and 6, the former of which is provided with an aperture 7 for a fastening device, such as a screw 8, and of which the latter is provided with a radial support 9, which projects terminally from the plate and is pointed to facilitate the driving thereof into the wall of a countersink or recess 10, formed in the furniture member. In practice the plate element 6, which forms the intermediate portion of the fastener, is adapted to be intermediately unsupported to provide for the yielding thereof and is arranged in an oblique position with relation to the face of the furniture member, whereby when the head of the pin 3 is engaged with the keyhole-slot 11 therein and is forced longitudinally of the plate from the enlarged portion of said slot along the reduced portion thereof, the head passing in rear of the plate, the tendency will be to slightly spring the plate outward at an intermediate point, and thus cause the drawing of the furniture member 2 to insure a tight joint.

In applying the fastener, the countersink or recess having been formed, the plate is arranged in an inclined position, as indicated in Fig. 4, to dispose the point of the terminal spur in contact with the wall of the recess close to the floor thereof, and by tapping the opposite end of the plate the spur is driven firmly into the wall of the recess. The plate is then forced inward to dispose the upper disk-like element thereof parallel with the face of the furniture member and is secured by the screw 8, said upper disk-like portion being preferably embedded to prevent any obstructions or projections. The bending of the plate adds stiffness thereto by placing the parts under tension, and thus guards against looseness or rattling, particularly when the headed pin, having been engaged with the enlarged portion of the keyhole-slot, is forced longitudinally of the plate to add to the flection. Any tendency of the spur in being forced outward to split the portion of the wood adjacent to the engaged wall of the countersink or recess is opposed by the pressure of the end of the connected furniture member against the member 2 opposite said spur, and the pressure of the end of the member 4 against the upper element 5 of the plate aids in holding the latter in its desired position. The end of the furniture member 4, concealing the fastening-plate and the joint between the furniture members by the means above described, is made sufficiently tight to exclude vermin.

It will be understood that the plate may be struck from sheet metal, and the headed pin may consist of a screw, as illustrated, thus reducing the cost of the fastener to the minimum, and the simplicity of attachment is such as to permit the general use of the device at the joints between the meeting members of an article of furniture without materially adding to the cost of such article. The countersinks for the disk-like elements of the plate may be formed by means of an ordinary auger, the diameters of the two portions being identical, so that both countersinks may be formed by means of one tool. Moreover, as the required countersinks are shallow the fastener may be applied to a furniture member which is not heavy or thick without materially detracting from the strength thereof.

Having described the invention, what is claimed is—

1. A joint-fastener for furniture consisting of a terminally-supported intermediately-flexed resilient plate having a keyhole-slot and arranged to exert a spring-clamping action, substantially as described.

2. A joint-fastener for furniture consisting of a terminally-supported intermediately-flexed spring-plate provided with a keyhole-slot, combined with a headed pin arranged approximately at right angles to the plate for engaging said slot, the intermediate portion of the plate being disposed obliquely to the path of movement of the headed pin in its engagement with said keyhole-slot and the plate being adapted to exert a spring-clamping action, substantially as described.

3. A joint-fastener for furniture consisting of a spring-plate provided at one end with a spur and having an opening near its other end, whereby the plate is terminally supported and is flexed between its ends when applied in position, said plate being also provided at an intermediate point with a keyhole-slot, substantially as described.

4. The combination with a furniture member having a countersink or recess, and an abutting furniture member having a terminal headed pin, of a spring-plate having a terminal spur engaged with the wall of said recess, the opposite extremity secured to the first-named furniture member adjacent to said countersink or recess, and an intermediate unsupported portion diagonally spanning the countersink or recess and provided with a keyhole-slot for engagement by said headed pin, said spring-plate being flexed and adapted to exert a clamping action to hold the said furniture members tightly against each other.

5. As a new article of manufacture, a joint-fastener consisting of a spring-plate having two disk-like elements and a narrow connecting portion, one of the disk-like elements being provided with a screw-hole and the other having a keyhole-slot, the latter element being also provided at a point opposite the first-named element with a radially-projecting spur, said plate being terminally supported when applied in position for use and being flexed at the narrow connecting portion and adapted to exert a spring-clamping action to hold the members of a piece of furniture tightly against each other, substantially as described.

In testimony that I claim the foregoing as my own I have hereto affixed my signature in the presence of two witnesses.

JOHN E. FAUGHT.

Witnesses:
EPH. K. STRONG,
W. H. KISSINGER.